Oct. 25, 1960     R. E. ENFIELD     2,957,468
SPEAR GUNS
Filed Oct. 10, 1955     2 Sheets-Sheet 1
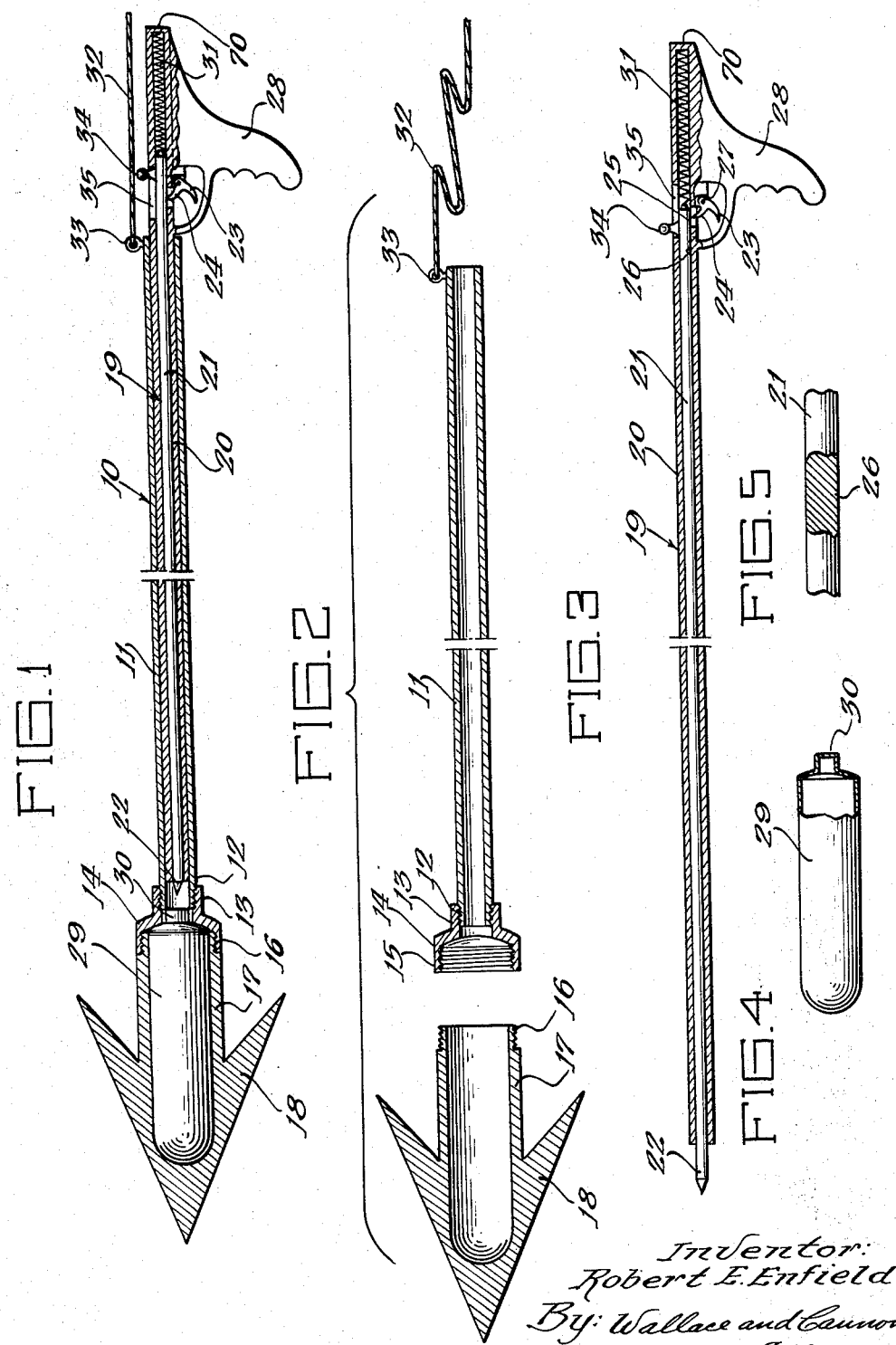

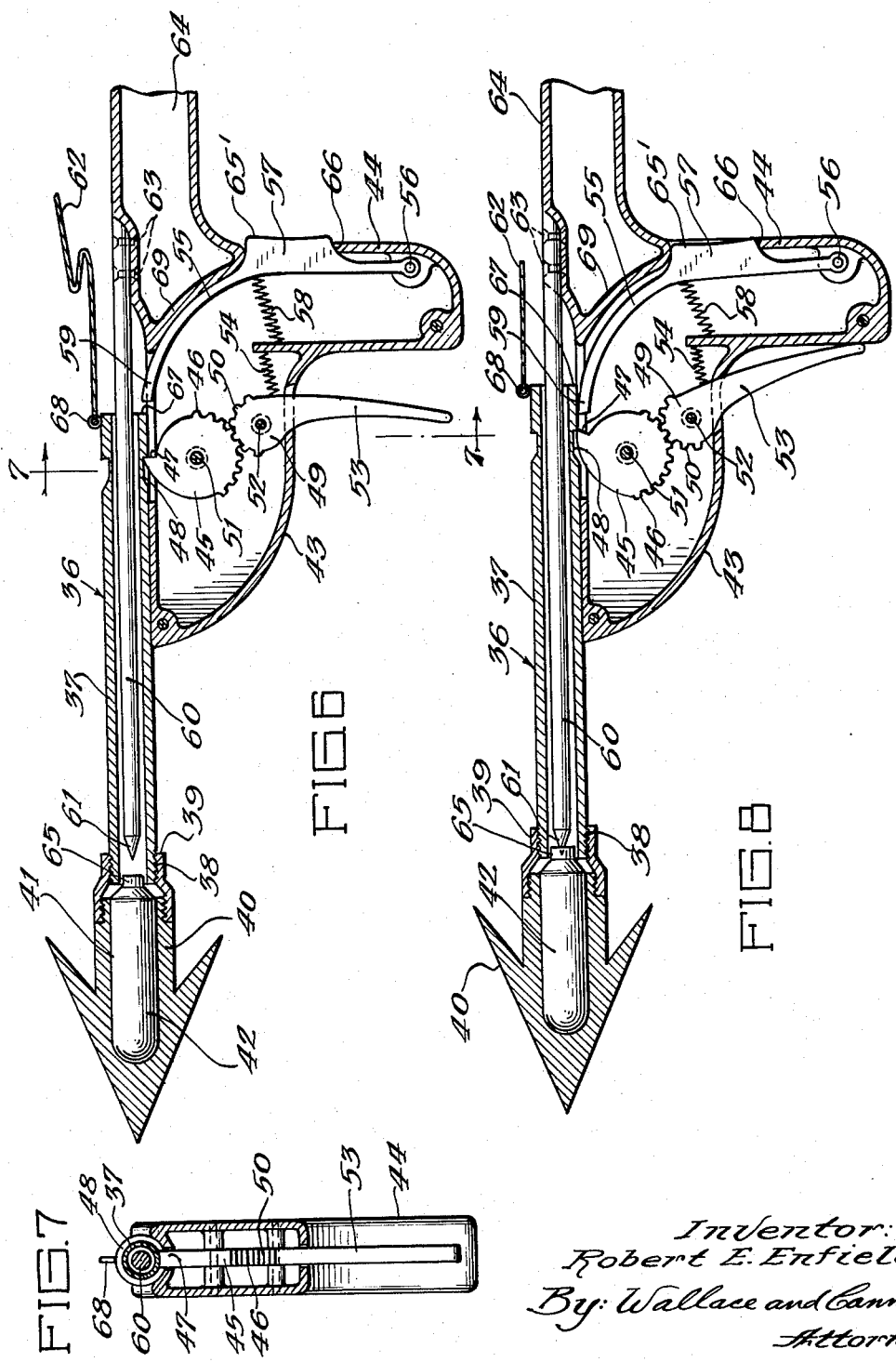

United States Patent Office 2,957,468
Patented Oct. 25, 1960

2,957,468
SPEAR GUNS
Robert E. Enfield, 16027 Lassen, Granada Hills, Calif.
Filed Oct. 10, 1955, Ser. No. 539,354
4 Claims. (Cl. 124—11)

This invention relates to an underwater spear gun which is particularly adapted for spearing fish in underwater fishing.

Underwater spear fishing has come to be a sport engaged in by many people but one of the difficulties experienced in connection therewith is the lack of satisfactory spear fishing equipment.

Accordingly, an object of the present invention is to provide a new and improved but simple underwater spear gun for spearing fish in underwater fishing.

Another object of the invention is to provide a new and improved underwater spear gun which is so designed and constructed and arranged that it can be readily carried by a person fishing underwater and in the use of which the spear is driven with sufficient force to effect its intended object of spearing fish.

An additional object of the invention is to provide, in one form thereof, a novel safety device for preventing accidental discharge of the spear unit from the supporting carriage of the new spear gun.

Other objects will appear hereinafter.

Fig. 1 is a longitudinal sectional view showing a preferred construction of the new underwater spear gun;

Fig. 2 is an exploded sectional view of parts of the new underwater spear gun shown in Fig. 1;

Fig. 3 is a fragmentary longitudinal sectional view showing certain parts of the new underwater spear gun shown in Figs. 1 and 2;

Fig. 4 is an elevational view of part of the compressed gas cartridge employed in the new underwater spear gun, part of the wall thereof broken away to show the interior thereof;

Fig. 5 is an enlarged fragmentary sectional view of a detail of construction embodied in the new underwater spear gun;

Fig. 6 is a longitudinal sectional view illustrating a modified form of construction of the new spear gun, showing the safety device embodied therein in effective position;

Fig. 7 is a transverse sectional view on line 7—7 in Fig. 6; and

Fig. 8 is a longitudinal sectional view, similar to Fig. 6, but showing the safety device embodied therein in released position.

A preferred embodiment of the new underwater spear gun is illustrated in Figs. 1 to 5, inclusive, of the drawings, wherein it is generally indicated at 10, and includes an elongated cylindrical barrel 11 having an externally threaded front end portion 12 to which an internally threaded neck portion 13 of a coupling member 14 is threadedly attached. The coupling member 14 has a relatively enlarged internally threaded end portion 15 for the reception of an externally threaded end portion 16 of a hollow spear head element 17, the spear head element 17 having a sharp pointed front end portion 18, as shown in the drawing.

The new underwater spear gun 10 also includes an inner propelling unit, generally indicated at 19, and which includes an elongated cylindrical barrel 20 having a gas release member in the form of an elongated piercing rod 21 slidably mounted therein. The rod 21 has a sharpened front end portion 22 which is adapted to project forwardly out of the barrel 20, as shown in Fig. 3. The propelling unit 19 also includes a manual trigger member 23 which is pivotally mounted, as at 27, on a frame member 28 and this trigger member 23 has a trigger 24 which is normally adapted to engage in a slot 25 which is formed in the wall of the barrel 20.

The propelling unit 19 also includes a spring 31 which is mounted in the barrel 20 rearwardly of the rear end portion of the piercing rod 21—22 and between the latter and the closed rear end wall 70 of the barrel 20.

A latching notch 26 is provided in the peripheral surface of the piercing rod 21 and the trigger 24 of the trigger member 23 is normally latchingly engaged in this notch 26 in order to hold the piercing rod 21—22 in retracted position, as shown in Fig. 1.

The new underwater spear gun 10 includes a compressed gas propelling cartridge 29 which is adapted to hold compressed air, or compressed carbon dioxide, or like compressible gas, under high pressure, and this cartridge 29 has a frangible stem or neck portion 30 of reduced diameter at the rear end thereof (right hand end, Fig. 4).

A flexible line 32 is attached to the rear end portion of the barrel 11, as at 33, for a reason which will be pointed out hereinafter.

The forward movement of the piercing rod 21 is limited by a stop button 34 which is mounted on the upper surface thereof and is slidably mounted in a slot 35 which is formed in the wall of the barrel 20.

In the use of the new underwater spear gun 10 the parts thereof may be assembled in the manner illustrated in Fig. 1, with the trigger 24 of the trigger member 23 latchingly engaged in the notch 26 of the piercing rod 21 and with the sharpened front end portion 22 of the rod 21 disposed somewhat rearwardly of the frangible neck 30 of the cartridge 29.

In order to assemble the parts in the manner shown in Fig. 1, the compressed gas cartridge 29—30 may be inserted into the hollow interior of the spear head element 17—18 whereupon the spear head element 17 and enclosed cartridge 29—30 may be attached to the coupling member 14—15, by threading the externally threaded neck portion 16 of the spear head element 17 into the internally threaded body of the coupling member 14 and then attaching the internally threaded neck portion 13 of the coupling member 14 to the externally threaded front end portion 11—12 of the barrel 11, and when the parts are so arranged the new underwater spear gun is ready for use.

In the use of the new underwater spear gun 10, with the parts assembled as described above, the same may be readily carried by a swimmer underwater and readily aimed at a fish whereupon the spear unit 11—12—13—14—15—16—17—18 may be readily discharged from the assembled gun by manipulating the trigger member 23 so as to release the trigger 24 thereof from engagement in the latching notch 26 in the rod 21, whereupon the normally compressed spring 31 will force the piercing rod 21 forwardly to drive the sharpened front end portion 22 thereof through the frangible neck 30 of the cartridge 29. The compressed gas thus allowed to escape through the punctured neck 30 of the cartridge 29 will thereupon exert a jet-like propulsion action and drive the spear unit 11—12—13—14—15—16—17—18 forwardly at the fish at which it is directed and thus accomplish the spearing operation.

After the spearing operation has been completed the spear unit 11—12—13—14—15—16—17 and 18 may be manually retracted by means of the flexible line 32 which is attached thereto, as at 33, and the empty cartridge 29—30 replaced by a new and filled cartridge, and the parts again assembled as in Fig. 1 ready for use.

A modified form of the invention is illustrated in Figs. 6, 7 and 8 of the drawings, and is therein generally indicated at 36 and includes a tubular barrel member 37 having an externally threaded front end portion 38 to which an internally threaded neck portion 39 of a spear head unit 40 is detachably connected. The spear head unit 40 has a cylindrical internal bore or chamber 41 in which a compressed gas cartridge 42 is mounted, this cartridge 42 being adapted to contain carbon dioxide, or other gas, under high pressure, and has a frangible reduced rear end portion 65.

The form of the new spear unit shown in Figs. 6, 7 and 8 of the drawings includes a trigger casing 43 having a hand grip portion 44 depending therefrom. A ratchet gear 45 is rotatably mounted at 51 in the trigger 43 and has a segment of gear teeth 46 formed thereon and also has a cam element 47 formed on the periphery thereof which engages in a notched portion 48 of the barrel 37.

A trigger member 53 is pivotally mounted, as at 52, in the trigger casing 43 and includes a ratchet gear 49 having segment of gear teeth 50 thereon which mesh with the gear teeth 46 of the ratchet gear 45. This trigger member 53 is normally urged into its at rest position, as in Fig. 6, by a suitable resetting coil spring 54 which is attached thereto and is mounted in the trigger casing 43.

A novel safety device is embodied in the form of the new spear gun shown in Figs. 6, 7 and 8 and this safety device includes a safety lever 57 having a hand grip portion 65' which normally projects rearwardly of the hand grip portion 44 of the trigger casing 43, through an opening or slot 66 which is formed in the rear wall of the hand grip member 44. The lower end portion of the safety lever 57 is pivotally mounted, as at 56, in the hand grip portion 44 of the trigger casing 43 and has an upper end portion 59 which is disposed slightly rearwardly of the rear wall 67 of the tubular barrel 37. When the parts are so arranged the mid portion 55 of the safety lever 57 engages a wall portion 69 of the stock 64, as in Fig. 6. The safety lever 57 is normally urged into its at rest and effective position, as in Fig. 6, by an expansion spring 58 having one end portion attached thereto and having its other end portion attached to a wall of the hand grip portion 44 of the trigger housing 43.

A firing pin member 60 is fixedly mounted in the tubular barrel 37 and has a sharpened piercing front end portion 61, the firing pin member 60 being stationarily fastened, by means of suitable fastening elements 63, upon the stock 64.

A flexible retrieving cord, as 62, is attached, as at 68, to the rear end portion of the tubular barrel 37.

In the use of the new spear unit shown in Figs. 6, 7 and 8 of the drawings a cartridge 42 of carbon dioxide, or other suitable gas, under high pressure, may be inserted in the chamber 41 of the spear head 40 and the spear head unit 40 then attached, by means of the threaded neck portion 39 thereof, to the threaded front end portion of the barrel 37. The parts will then be positioned as in Fig. 6 with the tubular barrel 37 disposed in its forward position and with the frangible rear end portion 65 of the cartridge 42 disposed slightly forwardly of the sharpened piercing front end portion 61 of the firing pin 60, and with the hand grip portion 65' of the safety lever 57 projecting rearwardly through the slot 66 formed in the wall 44 of the hand grip portion of the trigger housing 43.

When it is desired to discharge the spear unit 37–40 from the form of the new spear gun shown in Figs. 6, 7 and 8 this is readily accomplished by manually gripping the hand grip portion 44 of the trigger housing 43 and pressing inwardly on the hand grip portion 65' of the safety lever 57, thereby pivoting the latter inwardly, at 56, against the action of the resetting coil spring 58, into the position in which the parts are shown in Fig. 8. During this movement the front end portion 59 of the safety lever 57 passes under the rear end wall portion 67 of the barrel 37. The operator may then grasp the trigger 53 and pull it rearwardly, against the action of its resetting spring 54, toward the hand grip 44 and during this operation the trigger 53 will pivot, at 52, from the position in which it is shown in Fig. 6 into the position in which it is shown in Fig. 8. This motion of the trigger 53 is transmitted by the teeth 49 to the teeth 46 of the ratchet 45 which is thereupon rotated clockwise from the position in which it is shown in Fig. 6 into the position in which it is shown in Fig. 8. During this motion of the ratchet member 45 the cam portion 47 thereof engages in the notched wall section 48 of the barrel 37 and slides the latter and the spear head unit 40 rearwardly from the position in which these parts are shown in Fig. 6 into the position in which they are shown in Fig. 8 and during this operation the sharpened front end portion 61 of the firing pin member 60 engages and penetrates the frangible rear end portion 65 of the cartridge 42. The gas under high pressure in the cartridge 42 is thereupon discharged and the force of the rapidly discharging gas rapidly slidably ejects the spear head unit 37—40 from the firing pin 60 and thus discharges the spear head unit 37—40 at the fish or other object at which it is directed. During this motion of the spear head unit 37—40 the retrieving cord 62 follows the spear unit 37—40 to enable the latter to be pulled back and reassembled on the firing pin 60, as and when desired.

As the spear head unit 37—40 is ejected from the firing pin 60 the notched wall section 48 of the barrel 37 engages the cam portion 47 of the gear 45 and rotates the latter counterclockwise from the position in which it is shown in Fig. 8 into the position in which it is shown in Fig. 6 as the barrel 37 is ejected from the firing pin 60. The trigger lever 53 and the safety lever 57 are thereupon returned to their normal positions, as in Fig. 6, by their resetting springs 54 and 58, respectively.

It will be noted that the trigger member 53 cannot be operated or moved rearwardly to engage the frangible rear end portion 65 of the cartridge 42 with the piercing point 61 of the firing pin 60 until the safety lever 57—65' is positively pressed inwardly so as to move the upper front end portion 59 thereof out of the path of movement of the rear end wall 67 of the barrel 37, thus providing a positive safety unit which prevents accidental engagement of the piercing point 60 with the frangible end portion 65 of the cartridge 42 and accidental discharge of the spear head unit 40 from the new spear gun.

After each use of the new spear gun shown in Figs. 6, 7 and 8 the spear head unit 40 may be detached or unscrewed from the barrel 37 and the used gas cartridge 42 removed and replaced.

It will thus be seen from the foregoing description, considered in conjunction with the accompanying drawings, that the present invention provides a new and improved underwater spear gun, having the desirable advantages and characteristics, and accomplishing its intended objects, including those hereinbefore pointed out and others which are inherent in the invention.

I claim:

1. An underwater spear gun comprising a substantially straight elongated hollow shaft member having a front end portion and a rear end portion, a hollow spear head element detachably mounted on said front end portion to afford a spear with said hollow shaft member, a compressed gas cartridge having a frangible rear end portion mounted in said spear head with said frangible portion facing toward said first mentioned rear end portion, a substantially straight tubular support member projecting into said shaft member, a plunger slidably mounted in said support member for movement therein between a first position rearwardly of said frangible end and an actuated position effective to rupture said frangible end, means urging said plunger toward said actuated position, and means including a trigger mounted on said support member in position to engage said plunger and releasably latch said plunger in said first position.

2. An underwater spear gun comprising an elongated tubular shaft, a hollow barbed spear head removably mounted on one end of said shaft to form a spear, a compressed gas cartridge, having a frangible end portion, removably mounted within said spear head with said frangible end portion facing said one end of said shaft, an elongated support member engaging said shaft to support said shaft in predetermined alignment thereon, an elongated piercing rod, having a piercing tip at one end thereof, means for mounting said piercing rod on said support member with said rod extending into said shaft and with said tip of said rod disposed in spaced relation to said frangible end portion of said cartridge, and means for moving said shaft and said rod relative to each other to engage said tip of said rod with said frangible end portion of said cartridge, discharging the gas from said cartridge through said elongated shaft and driving said spear along a substantially straight path initially determined by aiming of said support member, said spear being maintained on said path by guiding action of said tubular shaft.

3. An underwater spear gun as set forth in claim 2, in which said support member is of elongated tubular construction, in which said support member is disposed within said shaft in encompassing relation to said rod, and in which said means for moving said shaft and said rod relative to each other comprises a spring mounted on said support member in engagement with said rod and normally urging said piercing rod toward engagement with said cartridge, latching means normally preventing movement of said rod toward said cartridge, and a trigger, connected to said latching means, for releasing said latching means to permit said rod to move into engagement with said cartridge.

4. An underwater spear gun as set forth in claim 2 in which said support member is substantially C-shaped in cross-sectional configuration and engages an external portion of said shaft, and in which said means for moving said shaft and said rod relative to each other comprises a trigger-controlled member for sliding said shaft longitudinally of said support member to engage said cartridge with said tip of said piercing rod, and a releasable safety lever for limiting movement of said shaft, to prevent accidental launching of said spear.

References Cited in the file of this patent
UNITED STATES PATENTS

| | | |
|---|---|---|
| 547,394 | Grady | Oct. 1, 1895 |
| 2,375,314 | Mills | May 8, 1945 |
| 2,588,184 | Walsh | Mar. 4, 1952 |

FOREIGN PATENTS

| | | |
|---|---|---|
| 932,247 | France | Mar. 16, 1948 |
| 1,020,589 | France | Feb. 9, 1953 |

OTHER REFERENCES

Popular Science, July 1945, page 152.